Dec. 27, 1960   W. M. SHERTS ET AL   2,966,006
MOLDING APPARATUS
Filed Sept. 25, 1957

INVENTORS
WILLIAM M. SHERTS &
WALTER E. ZURNEY
BY Oscar L. Spencer
ATTORNEY

Patent 2,966,006

United States Patent Office
2,966,006
Patented Dec. 27, 1960

2,966,006

MOLDING APPARATUS

William M. Sherts, Sewickley, and Walter E. Zurney, Kittanning, Pa., assignors to Pittsburgh Plate Glass Company, Allegheny County, Pa., a corporation of Pennsylvania Filed Sept. 25, 1957, Ser. No. 686,138

8 Claims. (Cl. 49—35)

This invention relates to glass molding apparatus and more particularly to molding apparatus especially adapted for the precision molding of glass articles.

In order to precision mold glass articles, it is necessary to axially align the mold members and prevent relative rotation therebetween. Axial misalignment of the mold members frequently occurs in automatic molding apparatus where a mold member suitably supported on a table is indexed to a position beneath a plunger assembly having the other mold member connected thereto for axial movement. This axial misalignment may be transverse and/or angular. However, the use of automatic machinery is desirable from a cost standpoint. To accurately align the mold members manually would be a tedious operation requiring a great deal of time and perhaps a slow-down of the machine. To provide adjusting means on the table and on the indexing mechanism for the apparatus would be extremely expensive and would require elaborate controls, thus, defeating the cost factor in the use of automatic molding apparatus.

The problems involved in accurately aligning the mold members may be easily alleviated by using the apparatus of this invention, which broadly comprises connecting the plunger and one of the mold members for concurrent axial movement while allowing a component of movement therebetween transverse to the axial movement and providing means for aligning the mold members while allowing the component of movement transverse to the axial movement. In addition, this apparatus prevents the relative rotation between the two mold members.

Therefore, the primary object of this invention is the provision of an improved molding apparatus, especially adapted for the precision molding of glass articles.

Other objects and features of this invention will become apparent from the following description when taken with the accompanying drawing, in which.

Figure 2:
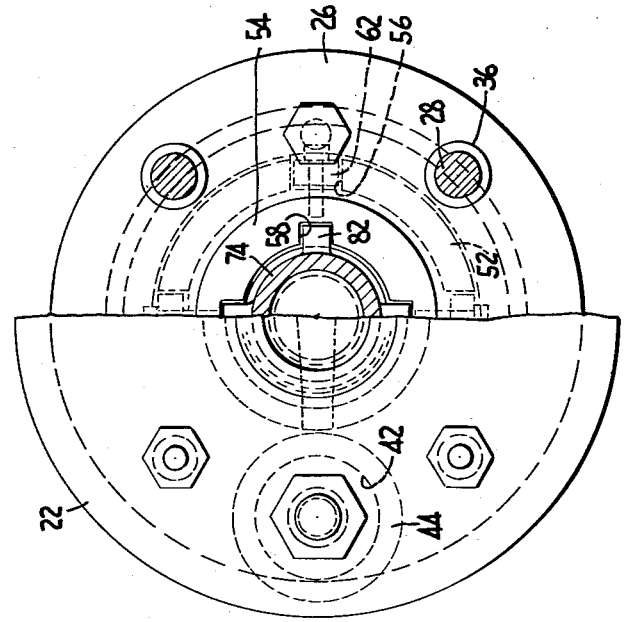
Figure 2 is a sectional view taken on line 2—2 of Figure 1.
Figure 3:
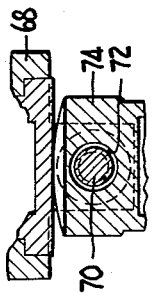
Figure 3 is a sectional view taken on line 3—3 of Figure 1.
Figure 1:
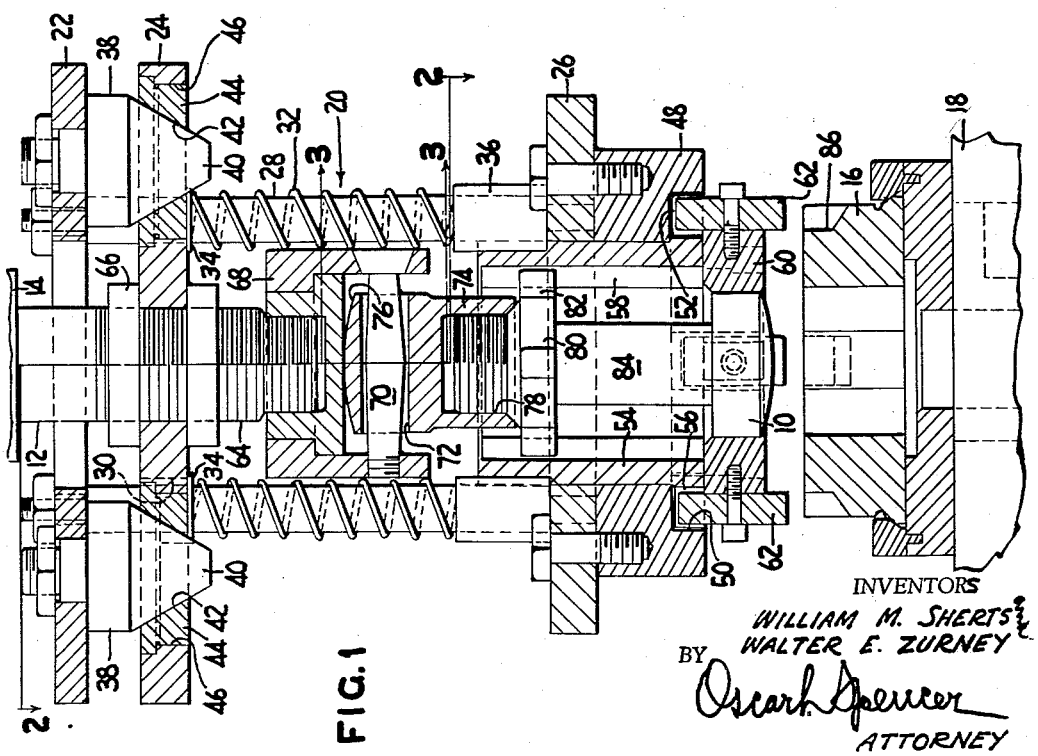
Figure 1 is an axial cross-sectional view of the apparatus of this invention.

Referring now to the drawing, there is illustrated a mold 10 connected in a manner to be described to a plunger 12 associated with an air cylinder 14, and a mold ring 16 for receiving the mold 10 and a female mold or insert (not shown) of any desired surface configuration. The mold ring 16 is suitably fixed to a table 18 for indexing movement to and from a position beneath the mold 10, as is known in the art. The air cylinder 14 is actuated in a conventional manner to axially move the plunger 12 and the connected mold 10 to and from a molding position, and conventional take-out means, such as a plunger disposed beneath the table 18 and not shown may be provided for removing the molded article from the mold ring.

A structure, which may hereinafter be referred to as a non-rotating spring cage, generally identified by the reference character 20, is associated with the plunger 12 and the mold 10 and cooperates with the mold ring 16 to axially align the mold 10 and the mold ring 16, as previously mentioned.

The spring cage comprises a top annular plate 22, an intermediate annular plate 24, a bottom annular plate 26, and a plurality (four being shown) of upstanding rods 28. The rods 28 are fixedly attached adjacent their terminal ends to the top and bottom plates 22 and 26, respectively, as illustrated, and pass through openings 30 in the intermediate plate 24, the openings 30 being larger in diameter than the rod 28 for allowing relative movement between the plate 24 and the rods 28 is hereinafter explained. Coiled compression springs 32 surround the rods 28 and are disposed between washers or the like 34 abutting the lower surface of the intermediate plate 24 and rod sleeve members 36 abutting the upper surface of the bottom plate 26. The springs 32, as is obvious, provide a resilient connection between the intermediate plate 24 and the remainder of the cage 20. The sleeve members 36 could be made integral with the rod 28 if so desired without departing from the spirit of this invention.

A pair of diametrically arranged depending members 38 having conical shaped portions 40 are fixed, as illustrated, to the top plate 22, and when the plates 22 and 24 are in their illustrated positions relative to one another, the conical shaped portions 40 are received within complementary conical openings 42 formed in inserts 44 received in suitable openings 46 in the intermediate plate 24. The inserts 44 may be of hardened metal and are easily replaceable when worn. However, the conical shaped openings 42 could be formed in the plate 24, if so desired. The members 38 prevent rotation of the mold 10 relative to plunger 12 as will be readily understood from the description which follows.

A jacket ring 48 is fixedly attached to the bottom plate 26, as by bolts, and is provided with an annular recess 50 to receive a flange 52 of a flanged guide sleeve 54 retained within the ring 48 and terminating above the plate 26. The flange 52 is provided with slots 56 spaced around its periphery, and the guide sleeve 54 is provided with spaced, internal, axially extending grooves 58, for purposes to be described.

A plunger ring 50 is fixedly attached to the jacket ring 48, its central opening slidably receiving the mold 10 when the apparatus is in the position illustrated. A plurality of axially disposed fingers 62 (four being shown) are attached, as by bolts, to the periphery of the ring 60 with their upper terminal ends extending within the slots 56 in the jacket ring 48 and their lower terminal end extending downwardly below the bottom surface of the plunger ring 60.

The plunger 12 is screw threaded adjacent its lower end, as at 64, and is attached intermediate its ends to the intermediate plate 24 by means of nuts 66 engaging the opposite surfaces of the plate 24. A yoke 68 is threadably received on the lower terminal end of the plunger 12, the yoke 68 being constructed in a plurality of parts as illustrated or as one integral unit, and receives a double tapered pin 70 spanning its depending arms. The pin 70 passes through a slightly enlarged opening 72 in a substantially cylindrical connecting element 74, the joint thus provided being akin to a universal joint. The element 74 is provided with a terminal, spherical surface 76 engaging the yoke 68 and an internally threaded cavity 78 at its other terminal end.

A spider-like member 80 has an extending portion threadably received in the cavity 78 and is provided with spaced peripheral extensions 82 receivable in the grooves 58 in the guide sleeve 54. A cylindrical member 84 is connected at its opposite terminal ends to the mold 10 and the spider-like member 80, thus completing the attachment of the mold 10 to the plunger 12. It is to be understood that the members 74, 80 and 84 could be integral without departing from the spirit of this invention.

The mold ring 16 is provided with a plurality of spaced, peripheral slots 86 aligned with the fingers 62 and adapted to receive the fingers 62 when the mold 10 is in its position for the molding operation, this occurring when the bottom surface of the plunger ring 60 fully contacts the top surface of the mold ring 16.

Assuming for purposes of description that the mold ring 16 is slightly misaligned with the plunger 12 and the mold 10, it will be apparent that when the air cylinder is energized to move the plunger 12 and the mold 10 downwardly into molding position, the spring cage 20 is also moved downwardly. The fingers 62 engage the top surface of the mold ring 16 and tend to engage the slots 86 in the mold ring 16. For the fingers 62 to engage the slots 86 it is necessary that the plunger ring 48 be shifted transversely, which shifting is prevented, due to the engagement of the conical surfaces 40 and 44.

Further downward movement of the plunger 12 changes the relative positions of the intermediate plate 24 and the rigidly connected top and bottom plate 22 and 26, respectively, the downward movement compressing the coiled compression springs 32 and unseating the conical surfaces 40 and 44. With the conical surfaces 40 and 44 unseated, the fingers 62 may then find their proper positions and engage the slots 86 to their fullest extent, the plunger ring and the plates 22 and 26 being then only resiliently connected, by means of the springs 32 and capable of moving transversely of the plate 24, this movement being allowed by the openings 30 in the plate 24 being larger in diameter than the rods 28.

Since the mold 10 is carried within the plunger ring 60, it also will have freedom of movement transversely to the axis of the plunger 12, such movement being allowed by the joint between the plunger 12 and the mold 10 which includes the yoke 68, the pin 70 and the opening 72 in the connecting member 74. Of course, in the actual molding operation, the direction of movement of the mold 10 must be axial and this axial movement of the mold 10 is assured by the spider-like member 80 having its peripheral extensions 82 guided in the grooves 58 in the guide sleeve 54. The spherical surface 76 on the terminal end of the member 74 assures the downwardly directed motion of the plunger 12 being imparted to the mold 10 regardless of the relative position thereof.

As is readily understood and as has been previously explained, the members 38 prevent the rotation of the mold 10 relative to the plunger 12 when the spring cage 20 is in the position illustrated. When the fingers 22 engage the slots 86, the conical surfaces 40 and 44 are disengaged, but with the fingers 62 positioned in the slots 86 no relative rotation between the mold 10 and the plunger 12 can occur.

Upon retraction of the plunger 12 and also the mold 10 from the molding position, the intermediate plate 24 is carried upwardly and the conical surfaces 40 and 44 guide the plates 22 and 26 and the associated structure to the illustrated position for a subsequent molding operation.

While this invention has been described with reference to one particular embodiment, it is to be understood that this is by way of illustration and not by way of limitation.

We claim:

1. Apparatus for molding glass articles comprising a pair of mold members one of which is movable and the other of which is fixedly positioned, said mold members being in substantial molding alignment about an axis and subject to misalignment from said axis, a plunger, means for axially moving said plunger, means for connecting said movable mold member to said plunger for movement therewith and for movement having a component transverse to that of said plunger, and inter-engaging means operatively associated with said pair of mold members during a molding operation and for aligning said mold members during a molding operation, said last-named means moving said movable mold member transversely of said plunger upon said mold members being misaligned from said axis.

2. Apparatus recited in claim 1 wherein said connecting means comprises a universal joint.

3. Apparatus as recited in claim 1, further including resilient means operatively associated with said plunger and allowing said moving of said movable mold member transversely of said plunger upon said mold members being misaligned from said axis.

4. Apparatus as recited in claim 1, further including cage means operatively associated with said plunger and said movable mold member, said cage means including resilient means allowing said moving of said movable mold member transversely of said plunger upon said mold members being misaligned from said axis and guide means for guiding said movable mold member in said axial direction with said plunger.

5. Apparatus as recited in claim 4, wherein said inter-engaging means includes a plurality of finger elements associated with one mold member and a corresponding number of finger receiving slots associated with the other mold member.

6. Apparatus as recited in claim 4, wherein said cage means further includes means to prevent relative rotation between said plunger and said movable mold member.

7. Apparatus for molding glass articles comprising a pair of mold members one of which is movable and the other of which is fixedly positioned, said mold members being in substantial molding alignment about an axis and subject to misalignment from said axis, a plunger, means for axially moving said plunger, means for connecting said movable mold member to said plunger for movement therewith and for movement having a component transverse to that of said plunger, an annular plate connected for movement to said plunger, a pair of connected annular plate members disposed on opposite sides of said plate, resilient means disposed between said plate and one of said plate members to allow relative resilient transverse motion therebetween, guide means operatively associated with said one plate member for guiding said movable mold member in a substantially axial path, and interengaging means operatively associated with said pair of mold members during a molding operation and for aligning said mold members during a molding operation, said last-named means moving said movable mold member transversely of said plunger upon said mold members being misaligned from said axis and providing relative resilient transverse motion between said plate and said one of said plate members.

8. Apparatus as recited in claim 7, further including means connected to the other of said plate members and cooperating with said plate to prevent relative rotation between said movable mold member and said plunger.

References Cited in the file of this patent

UNITED STATES PATENTS

| Number | Name | Date |
|---|---|---|
| 363,152 | Maine | May 17, 1887 |
| 1,642,722 | Davis | Sept. 20, 1927 |
| 1,647,532 | Lorenz | Nov. 1, 1927 |
| 2,028,021 | Shippy | Jan. 14, 1936 |
| 2,508,890 | Rowe | May 23, 1950 |
| 2,640,325 | Haller | June 2, 1953 |